April 24, 1928. 1,666,941

M. MARTIN ET AL

INTERNAL COMBUSTION ENGINE

Filed Dec. 16, 1927 3 Sheets-Sheet 2

Inventors:
Morris Martin
and
William R. Werner
By [signature]
Attorney.

April 24, 1928.

M. MARTIN ET AL 1,666,941

INTERNAL COMBUSTION ENGINE

Filed Dec. 16, 1927

Inventors:
Morris Martin
and William R. Werner
By
Attorney.

Patented Apr. 24, 1928.

1,666,941

UNITED STATES PATENT OFFICE.

MORRIS MARTIN, OF CURL CURL, NEAR SYDNEY, AND WILLIAM ROBERT WERNER, OF NYMAGEE, NEW SOUTH WALES, AUSTRALIA.

INTERNAL-COMBUSTION ENGINE.

Application filed December 16, 1927, Serial No. 240,542, and in Australia October 15, 1926.

This invention relates to an internal combustion engine of the reciprocating type and particularly to an improved construction wherein two combustion or firing chambers are arranged in tandem fashion and two separate pistons, one for each of said chambers, are coupled together so as to drive the crankshaft of the engine through a common connecting rod.

Our invention also features improved means of lubricating the engine parts.

In the accompanying exemplary drawings:—

Figure 1:
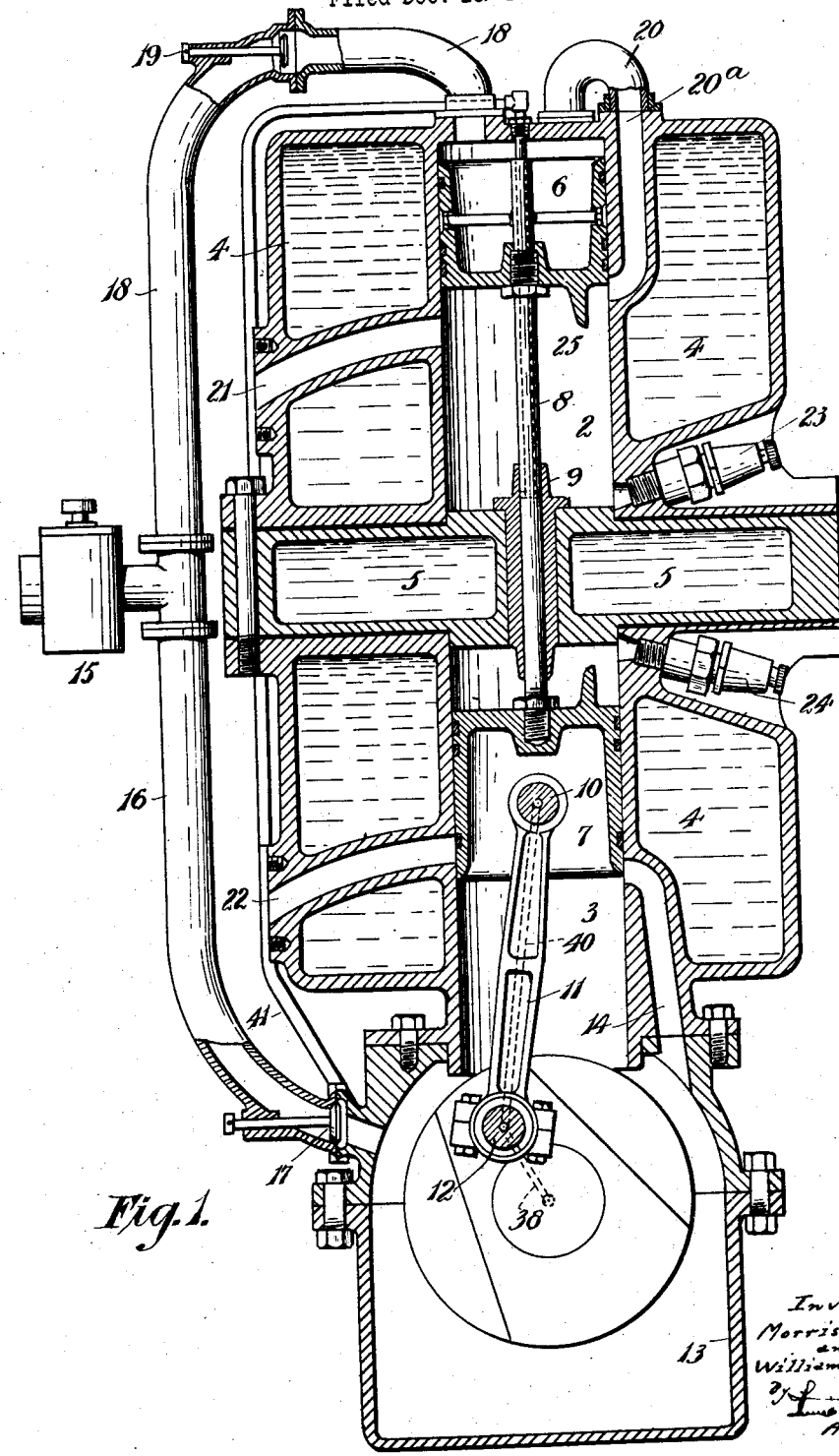
Figure 1 is a sectional view of the improved engine showing the positions of the pistons during the explosion in the lower of the tandem cylinders.

As illustrated in these views, the improved engine comprises two combustion or firing cylinders 2 and 3 arranged in tandem fashion and preferably vertically. Each of these cylinders is provided with an encircling cooling jacket 4 for the circulation of water or suitable cooling fluid, and a further cooling jacket 5 is preferably interposed between the cylinders to effectively cool the firing ends of the cylinders.

Slidably fitted within the cylinders are pistons 6 and 7, respectively, rigidly coupled together by a piston rod 8 which is slidable in a gland or packing member 9 fitted through the cooling jacket 5. The lower piston 7 is connected by a gudgeon pin 10 to a connecting rod 11 through which the power strokes of both pistons are transmitted to drive the engine crankshaft 12.

The crankcase 13 of the engine is connected to the lower open end of the cylinder 3 and is used as an induction and compression chamber for forcing gaseous fuel mixture into the firing end of said lower cylinder 3 through a transfer passage 14. The crankcase is connected to a carbureter 15 by a fuel induction pipe 16 provided near to its lower end with a non-return valve 17 to prevent backflow of the gaseous fuel during the compression of the fuel within the crankcase.

The cylinder 2 is connected at its upper end to a fuel induction pipe 18 leading either to the carbureter 15 or to a separate carbureter. Said induction pipe 18 is provided near to its upper end with a non-return valve 19 similar to the valve 17 and adapted to prevent escape of the gaseous fuel while it is being compressed in the upper end of the cylinder 2. A transfer pipe 20 of curved shape is connected to the upper end of the cylinder 2 and is adapted to deliver the compressed gaseous fuel to the lower firing end of said cylinder through a transfer passage 20ª formed in the cylinder casing.

The cylinders are provided with exhaust ports 21 and 22, and spark plugs 23 and 24, while the pistons 6 and 7 preferably have deflecting vanes 25 and 26 arranged adjacent to the transfer ports to deflect the incoming gaseous fuel mixture towards the ends of the cylinders in the ordinary manner to satisfactorily expel the burnt gases.

In the operation of the engine, charges of gaseous fuel mixture are exploded alternately in the upper and lower cylinders 2 and 3, and the power strokes of both pistons 6 and 7 are transmitted to the crankshaft 12 through the single connecting rod 11. A charge of fuel mixture having been exploded in the upper end of the cylinder 3, the piston 7 is driven downwardly, and through the piston rod 8 the piston 6 of the upper cylinder 2 is similarly caused to move downwardly. In the downward movement of the lower piston 7 gaseous fuel mixture is compressed in the crankcase 13, while in the downward movement of the upper piston 6 a fuel charge is compressed in the firing end of the cylinder 2 and fuel mixture is also induced into the upper end of the cylinder 2 through the induction pipe 18 and valve 19.

Towards the termination of the power stroke of the lower piston 7, the exhaust port 22 is uncovered by the piston to allow the burnt gases to escape to atmosphere, and later the end of the transfer passage 14 is uncovered to admit the compressed fuel mixture from the engine crankcase 13 into the firing end of the cylinder 3. The incoming gases are deflected upwardly within the cylinder by the vane 26, thus causing the burnt gases to be displaced and satisfactorily expelled.

Figure 2:
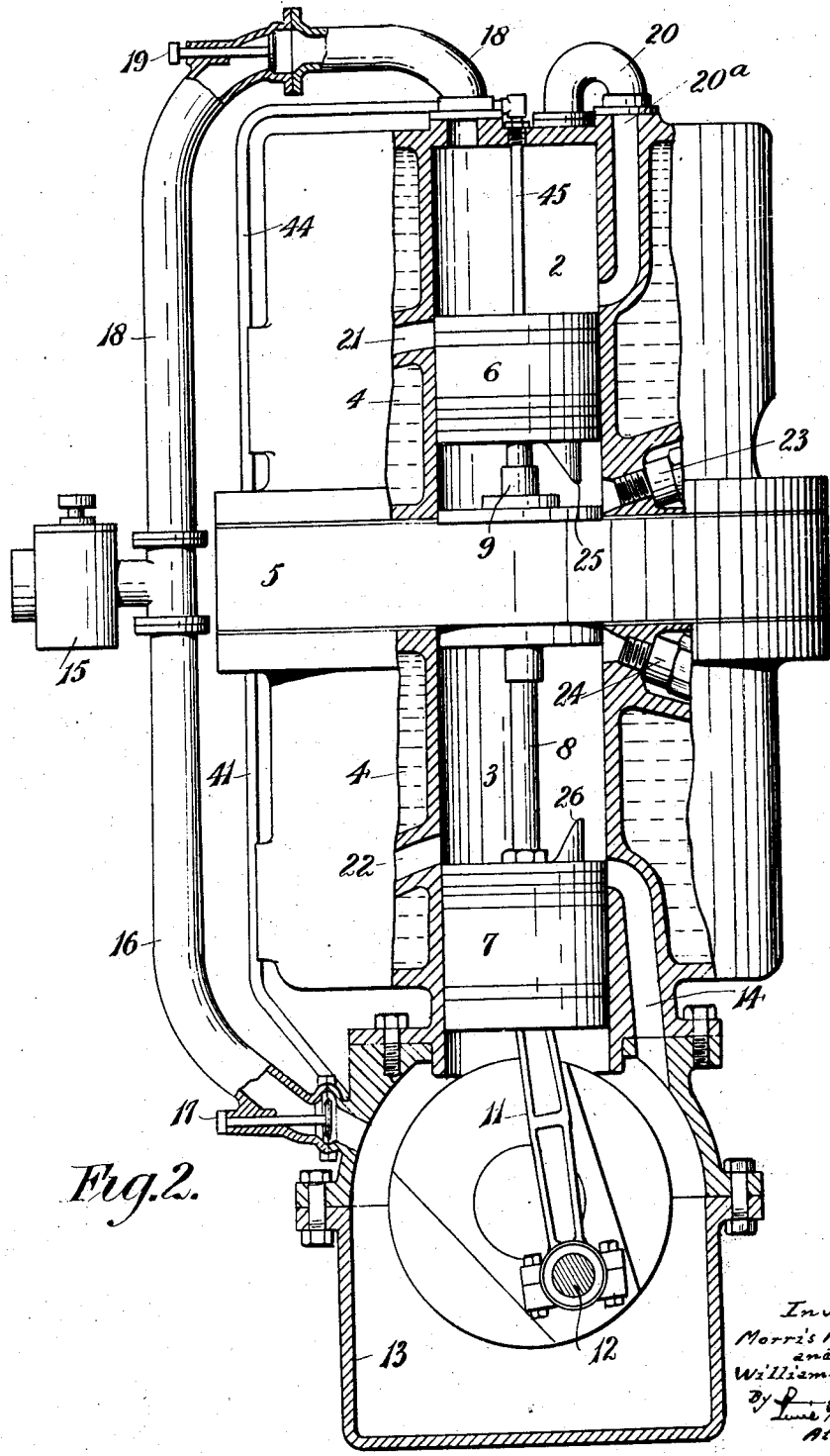
Figure 2 is a sectional view showing the positions of the pistons during the explosion in the upper cylinder.
Figure 3:
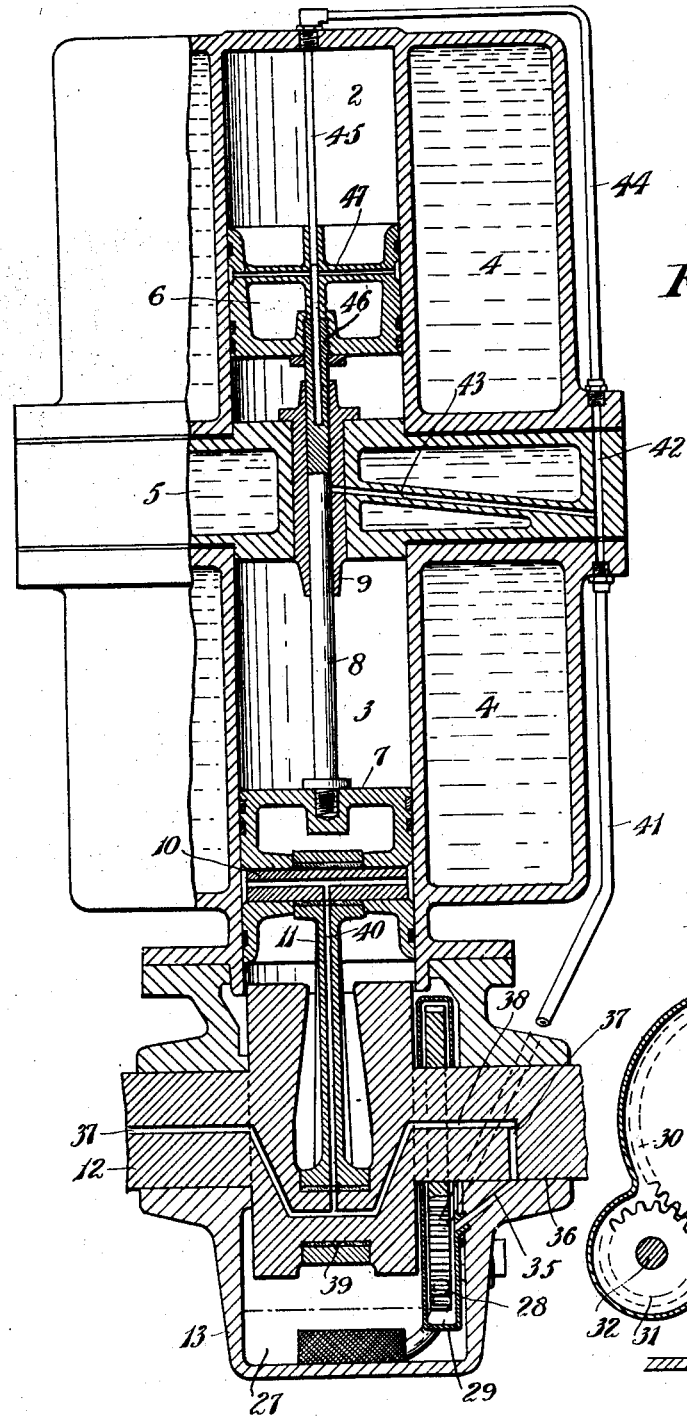
Figure 3 is a detail view in section showing the general arrangement of the lubricating system for the working parts of the engine.
Figure 4:
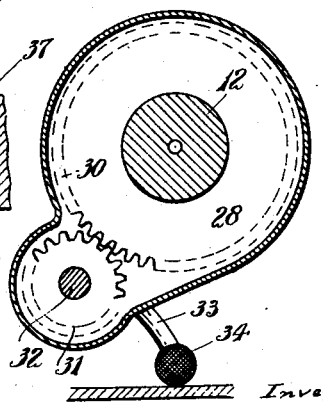
Figure 4 is a detail view of the lubricating oil pump.

The compressed charge of fuel mixture in the upper cylinder 2 is now fired by the spark plug 23 (see Figure 2), causing both of the pistons to be forced upwardly within their cylinders. The upward movement of the piston 6 compresses the quantity of fuel mixture in the upper end of the cylinder, while the upward movement of the lower piston 7 compresses the fresh fuel charge in the upper end of the cylinder 3 and also induces fuel mixture into the crankcase 13 through the induction pipe 16 and valve 17. At the termination of the explosion stroke of the piston 6, the exhaust port 21 and transfer passage 20$^a$ are uncovered and compressed fuel mixture from the upper end of the cylinder 2 is admitted to the firing end of said cylinder through the pipe 20 and said transfer passage 20$^a$ to expel the burnt gases.

The fuel mixture in the lower cylinder is then fired by the spark plug 24 and the sequence of operations herein described is repeated, the cylinders firing alternately and two impulses being imparted through the connecting rod 11 to the crankshaft 12 in each complete revolution.

By the invention increased driving power is obtained without appreciably increasing the dimensions of the engine, and, furthermore, an even torque upon the crankshaft is obtained, both of which advantages are highly desirable.

The lubricating system for the engine comprises an oil sump 27 provided in the lower end of the crankcase 13 and a gear pump 28 mounted in a casing 29 within the crankcase. The pump 28 consists of a large gear wheel 30 mounted directly on the engine crankshaft 12 and a small gear wheel 31 meshing with said wheel 30 and loosely mounted on a pin or spindle 32. The lubricating oil in the sump 27 is elevated by the pump through a pipe 33 and straining screen 34 and forced through a diagonal passage 35 to the crankshaft bearing 36. From the bearing 36 the oil passes through a duct 37 to an axial passageway 38 formed in the crankshaft and is forced to the crank pin bearing 39 and then upwardly through a hole 40 in the piston rod 11 to the gudgeon pin bearing of the lower piston 7 and the walls of the cylinder 3.

The lubricating oil from the pump is also forced upwardly through a pipe 41 to a passageway 42 formed in the cooling jacket 5, and is delivered via the passage 43 to the gland or packing member 9 for the lubrication of the sliding piston rod 8. A pipe 44 conducts lubricating oil from the passageway 42 and delivers it through a tube 45 into the tubular upper end 46 of the piston rod 8. During the reciprocating movement of the upper piston 6, the tube 45 slidably moves within the tubular end 46 of said rod 8 and the oil is forced outwardly through ports or passages 47 in the piston to lubricate the walls of the upper clyinder 2.

What we do claim is:—

An improved internal combustion engine comprising, two combustion or firing cylinders arranged in tandem fashion, two pistons slidable one in each of said cylinders, a rod rigidly coupling said pistons together for movement in unison, an engine crankshaft, a single connecting rod adapted to transmit the power strokes of both pistons to said crankshaft, a crankcase wherein gaseous fuel mixture is compressed, a transfer passage delivering said compressed fuel mixture from the crankcase to one of the engine cylinders, means for supplying gaseous fuel mixture to one end of the other cylinder for compression, a transfer pipe delivering said compressed fuel mixture from said supplying means to the firing end of said other cylinder, and means for firing the fuel charges alternately in said cylinders.

In testimony whereof we affix our signatures.

MORRIS MARTIN.
WILLIAM ROBERT WERNER.